(12) United States Patent
Schmidt et al.

(10) Patent No.: US 11,482,965 B2
(45) Date of Patent: Oct. 25, 2022

(54) STACKING SPACER, PHOTOVOLTAIC MODULE FRAME AND TRACKING DEVICE ASSEMBLY

(71) Applicant: Saint-Augustin Canada Electric Inc., Saint-Augustin de Desmaures (CA)

(72) Inventors: Christoph Schmidt, Gunzenhausen (DE); Gerrit Lange, Freiburg (DE); Wolfgang Aipperspach, Freiburg (DE)

(73) Assignee: SAINT-AUGUSTIN CANADA ELECTRIC INC., Saint-Augustin de Desmaures (CA)

( * ) Notice: Subject to any disclaimer, the term of this patent is extended or adjusted under 35 U.S.C. 154(b) by 0 days.

(21) Appl. No.: 15/745,314

(22) PCT Filed: Jul. 11, 2016

(86) PCT No.: PCT/CA2016/050806
§ 371 (c)(1),
(2) Date: Jan. 16, 2018

(87) PCT Pub. No.: WO2017/008150
PCT Pub. Date: Jan. 19, 2017

(65) Prior Publication Data
US 2018/0212555 A1 Jul. 26, 2018

(30) Foreign Application Priority Data

Jul. 16, 2015 (DE) .......................... 102015213396.6

(51) Int. Cl.
*H02S 20/32* (2014.01)
*H02S 30/10* (2014.01)
(Continued)

(52) U.S. Cl.
CPC .............. *H02S 20/32* (2014.12); *F24S 25/00* (2018.05); *H02S 20/00* (2013.01); *H02S 30/10* (2014.12);
(Continued)

(58) Field of Classification Search
CPC .......... H02S 30/10; H02S 40/00; H02S 20/00; H02S 20/32; F24S 2025/013; B65D 81/054
(Continued)

(56) References Cited

U.S. PATENT DOCUMENTS

2008/0066801 A1* 3/2008 Schwarze ............... H02S 20/23
136/251
2009/0078299 A1 3/2009 Cinnamon et al.
(Continued)

FOREIGN PATENT DOCUMENTS

CN 101868860 A 10/2010
CN 101176223 B 8/2011
(Continued)

OTHER PUBLICATIONS

DE102014000277A1 English machine translation (Year: 2015).*
(Continued)

*Primary Examiner* — Andrew J Golden
(74) *Attorney, Agent, or Firm* — TraskBritt

(57) ABSTRACT

A stacking spacer for a photovoltaic module frame comprises a main body, extending in a longitudinal direction, a connecting member, extending in the longitudinal direction and protruding from the main body, adapted for being inserted in at least one lateral profile groove of the photovoltaic module frame, and two opposed support members, arranged on respective opposed longitudinal sides of the main body, extending in the longitudinal direction, wherein the two opposed support members have complementary
(Continued)

forms, whereby at least two stacking spacers can be securely stacked on top of each other. Photovoltaic module frames and tracking device assemblies may include photovoltaic modules comprising such stacking spacers.

7 Claims, 7 Drawing Sheets

(51) Int. Cl.
*H02S 20/00* (2014.01)
*F24S 25/00* (2018.01)

(52) U.S. Cl.
CPC ......... *F24S 2025/013* (2018.05); *Y02E 10/50* (2013.01)

(58) Field of Classification Search
USPC .................................................. 136/243–265
See application file for complete search history.

(56) References Cited

U.S. PATENT DOCUMENTS

| | | | |
|---|---|---|---|
| 2009/0126794 A1 | 5/2009 | Dimroth et al. | |
| 2011/0108498 A1 | 5/2011 | Haeberlein | |
| 2011/0220598 A1* | 9/2011 | Flossmann | F24S 21/00 211/59.4 |
| 2011/0263067 A1 | 10/2011 | Vaid et al. | |
| 2012/0082537 A1 | 4/2012 | Yoshida | |
| 2012/0152320 A1* | 6/2012 | Aguglia | F24S 80/30 136/248 |
| 2012/0163954 A1 | 6/2012 | Yoshida | |
| 2012/0180406 A1* | 7/2012 | Kobayashi | F24S 25/61 52/173.3 |
| 2013/0037087 A1* | 2/2013 | Janssens | H02S 30/10 136/251 |
| 2015/0107651 A1 | 4/2015 | Cinnamon et al. | |

FOREIGN PATENT DOCUMENTS

| | | | | |
|---|---|---|---|---|
| CN | 102530353 A | 7/2012 | | |
| CN | 203871354 U | 10/2014 | | |
| CN | 103029925 B | 1/2015 | | |
| CN | 102376919 B | 9/2015 | | |
| CN | 102530417 B | 4/2016 | | |
| DE | 102006007472 A1 | 8/2007 | | |
| DE | 102014000277 A1 * | 7/2015 | ............ | H02S 30/10 |
| EP | 2346089 A1 | 7/2011 | | |
| WO | 2008105707 A1 | 9/2008 | | |
| WO | 2015/077526 A1 | 5/2015 | | |

OTHER PUBLICATIONS

European Supplementary Search Report and Search Opinion Received for EP Application No. 16823585, dated Mar. 7, 2019, 10 pages.
Chinese First Notification of Office Action for Chinese Application No. 201680047329.0 dated Feb. 2, 2019, 9 pages.
German Search Report for German Application No. 102015213396.6 dated Mar. 31, 2016, 8 pages.
International Search Report for International Application No. PCT/CA2016/050806 dated Aug. 29, 2016, 4 pages.
International Written Opinion for International Application No. PCT/CA2016/050806 dated Aug. 29, 2016, 4 pages.
Canadian Office Action for Canadian Application No. 2,992,644, dated Dec. 18, 2018, 3 pages.
Chinese Search Report for Chinese Application No. 201680047329, dated Jan. 28, 2019, 2 page.
Chinese Search Report for Chinese Application No. 201680047329, dated Nov. 18, 2019, 1 page.
Chinese Second Office Action for Chinese Application No. 201680047329, dated Aug. 22, 2019, 16 pages with English Translation.
Indian Examination Report for Indian Application No. 21847005146 dated Nov. 21, 2019, 6 pages.
Canadian Office Action for Canadian Application No. 2992644 dated Feb. 5, 2020, 5 pages.
European Communication pursuant to Article 94(3) EPC for European Application No. 16823585, dated Jul. 30, 2020, 9 pages.
Canadian Office Action from Canadian Application No. 2992644, dated Dec. 23, 2021, 5 pages.

* cited by examiner

STACKING SPACER, PHOTOVOLTAIC MODULE FRAME AND TRACKING DEVICE ASSEMBLY

CROSS-REFERENCE TO RELATED APPLICATIONS

This application is a national phase entry under 35 U.S.C. § 371 of International Patent Application PCT/CA2016/050806, filed Jul. 11, 2016, designating the United States of America and published in English as International Patent Publication WO 2017/008150 A1 on Jan. 19, 2017, which claims the benefit under Article 8 of the Patent Cooperation Treaty to German Patent Application Serial No. 102015213396.6, filed Jul. 16, 2015.

TECHNICAL FIELD

This application relates to means for stacking a photovoltaic module frame and mounting the same to a tracking unit, especially in concentrator photovoltaic systems. The present disclosure relates, in particular, to a photovoltaic module frame, to a stacking spacer for a photovoltaic module frame, and to a device for mounting the photovoltaic module frame and/or the stacking spacer on a tracking unit.

BACKGROUND OF THE INVENTION

During the production of photovoltaic modules, and especially for the high volume production of concentrator photovoltaic (CPV) modules, the module frames and eventually the finalized modules need to be stacked and stored saving as much space as possible and preventing damage to one another. In order to avoid individual module frames in a stack from contacting and thereby possibly damage one another, and due to narrow frame contours, additional elements are usually mounted on the frames to secure them for stacking and handling purposes during the photovoltaic modules manufacturing or assembling process. It is also known to use these elements to keep a defined clearance between each frame and/or photovoltaic module in a stack to avoid damage during stacking or transportation of the frames and/or modules. Means for stacking photovoltaic modules are known in the art, such as transport corner elements, usually made out of plastic or other synthetic materials.

However, stacking elements known in the art have a limited load capacity given that the weight or load transfer happens over the stacked elements, in other words over the module frames themselves. Thus, they have the disadvantage that the lower frame or framed module in a given stack supports the weight of all the frames or framed modules on top of it. Furthermore, such known means for stacking and spacing module frames are usually not reusable and are intended only for stacking and spacing purposes. In other words, they have no other practical function.

Once they are stacked, a plurality of stacked module frames or stacked assembled modules can form shipping units that can be transported, for example, from a manufacturer to another or from the production site to a distributor and eventually to a location where the modules will be mounted on one or more tracking units. In the latter case, photovoltaic module frames are usually not provided with means to attach them to a tracking unit. Thus, in addition to stacking and/or spacing elements, it is also known to use additional parts or mounting means for mounting photovoltaic modules on tracking units. Means for attaching photovoltaic modules to a tracking unit are disclosed in DE 10 2006 007 472 A1.

However, existing devices for mounting photovoltaic, in particular, concentrator photovoltaic, modules on a tracking unit or structure can be expensive in terms of cost per piece. Using existing devices and means for mounting photovoltaic modules on tracking units can also be time consuming.

Thus, in the photovoltaic industry, there is a need for improved means for stacking photovoltaic module frames or already assembled photovoltaic modules, as well as for improved means for mounting the same on tracking units.

BRIEF SUMMARY

The object of the disclosure is, therefore, to provide a solution for stacking photovoltaic module frames and mounting the same on tracking units taking the above problems into account.

The object of the disclosure is achieved with a stacking spacer, a photovoltaic module frame, and a tracking device assembly. Advantageous optional features are described in the dependent claims and will also be detailed in the description hereafter.

Stacking spacers for insertion in a lateral profile groove of a photovoltaic module frame have the advantage that the load transfer between frames in a stack of photovoltaic module frames or assembled photovoltaic modules happens mainly between stacking spacers and not between frames. Photovoltaic frames or assembled photovoltaic modules stacked using stacking spacers according to the disclosure are protected from damage to the frames and also to the lens plates and receiver plates, as a direct contact between frames is at least partially avoided because the distance, or clearance, between frames in a stack depends mainly on the geometry of the stacking spacers.

The two opposed support members have complementary forms, in particular, concave or convex with respect to the main body of the stacking spacer, which provides for a self-alignment or self-centering and secure stacking when two or more stacking spacers are stacked on top of each other, as one support member of a top stacking spacer will "slip," in other words it will be accommodated automatically, into the form-fitted opposed support member of the underlying stacking spacer, without requiring a user to have to position a top frame on top of the underlying frame in an exactly centered manner.

A photovoltaic module frame according to the disclosure has the advantage over the known state of the art that it can be received directly on a tracking unit, in particular, on a spacing element thereof, without requiring additional pieces. When it is used in combination with inventive stacking spacers, the stacking spacers can be received on the spacing element of the tracking unit instead of the module frame itself without needing to be disassembled from the module frame. Indeed, one of the opposed support members of the stacking spacer can be shaped for being received on the spacing element of a tracking device assembly, and also for at least partially receiving a mounting bracket of the tracking device assembly.

Thus, the stacking spacer can also be used for mounting and fixing the assembled photovoltaic module to one or more tracking units. In particular, after transport of the frames or assembled modules, the disclosure, in its many aspects, can also be used for mounting and fixing the assembled photovoltaic modules on tracking units, which is also an improvement compared to stacking elements known in the art. Furthermore, if not used for such a mounting purpose, stacking spacers according to the disclosure are reusable for further stacks of frames or framed modules, or for further transporting of module frames or framed photovoltaic modules, for instance, modules dismounted from their tracking unit for maintenance purposes. In other words, stacking spacers and photovoltaic module frames according to the disclosure can advantageously be used in stacking units for storage and/or transport purposes before or after assembly of the photovoltaic modules.

A tracking device assembly according to the disclosure is advantageously able to accommodate an inventive module frame without using other intermediate mounting elements. When used in combination with a set of inventive stacking spacers, inventive module frames, and in fact even module frames known in the art, can also be mounted easily on the inventive tracking device assembly. Thus, the inventive tracking device assembly can also accommodate any combination of inventive module frames without any stacking spacers and/or inventive module frames combined with inventive stacking spacers and/or modules frames known in the art used in combination with inventive stacking spacers.

BRIEF DESCRIPTION OF THE DRAWINGS

The disclosure and its variants will be described more in detail in the following, based on advantageous embodiments and with reference to the following figures.

DETAILED DESCRIPTION

Figure 1A:
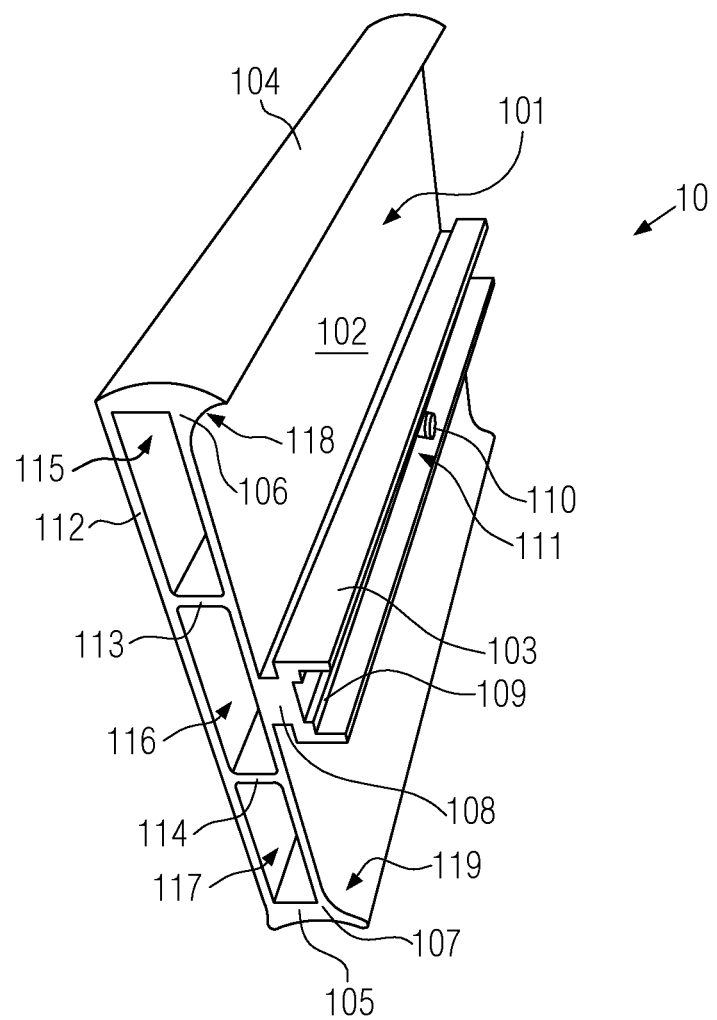
FIGS. 1A and 1B illustrate two variants of an embodiment of a stacking spacer according to the disclosure, respectively.
Figure 1B:
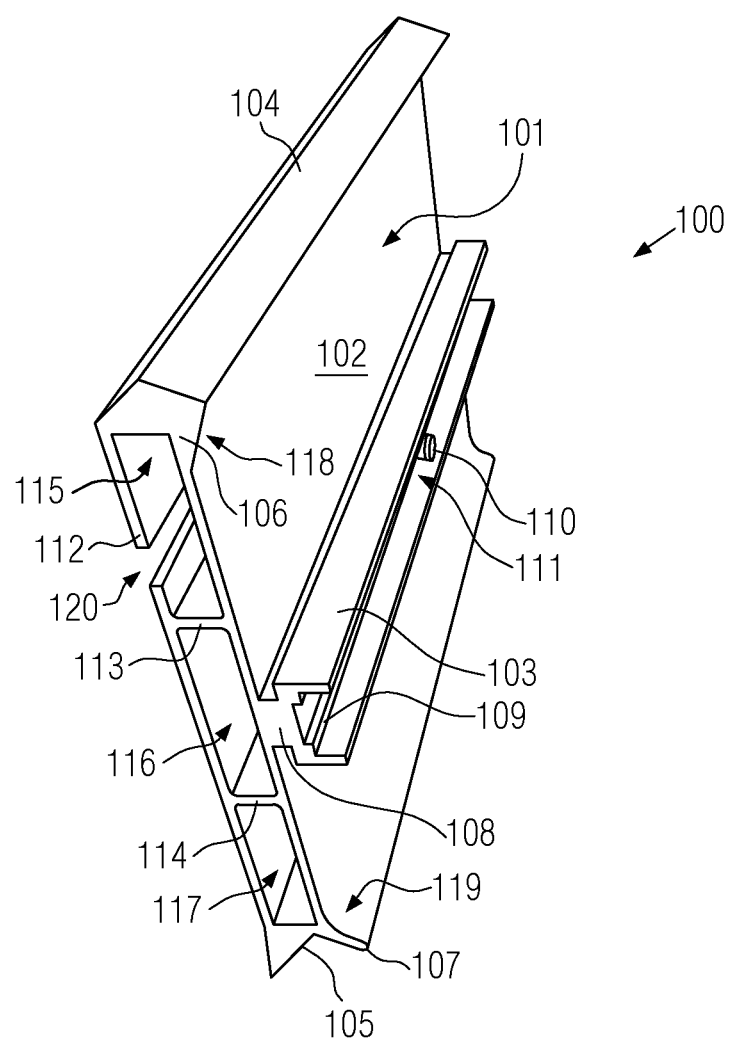

FIGS. 1A and 1B illustrate two variants of an embodiment of a stacking spacer 10, 100 for insertion in a lateral profile groove of a photovoltaic module frame according to the disclosure. An embodiment of a photovoltaic module frame 200 with at least one lateral profile groove 206, 207 in which any one of the variants of stacking spacers 10 or 100 illustrated in FIGS. 1A and 1B can be inserted, in particular, slidably inserted, will be described hereafter in relation to FIGS. 2A and 2B.

The stacking spacers 10, 100 of the embodiments illustrated in FIGS. 1A and 1B both comprise a main body 101, which can have a rectangular-shaped first main face 102 from which protrudes a connecting member 103, which extends along the entire longitudinal dimension of the first main face 102 and hence of the main body 101. The protrusion of the connecting member 103 is substantially perpendicular to the first main face 102. The longitudinal connecting member 103 will be inserted in one of the lateral profile grooves 206, 207 of a photovoltaic module frame 200 as illustrated hereafter in FIGS. 2A and 2B. Further, the stacking spacers 10, 100 of the embodiments illustrated in FIGS. 1A and 1B also both comprise two opposed longitudinal support members 104, 105 arranged each on an opposing longitudinal side or edge 106, 107 of the main body 101. The two opposed support members 104, 105 protrude from the main body 101, in particular, from the first main face 102, and are substantially parallel to the connecting member 103, and extend thus also along the longitudinal dimension of the first main face 102 and hence of the main body 101. The distance from one support member 104 to the opposed support member 105 is at least substantially equal or superior to the thickness of a photovoltaic module frame 200, as can be seen, for instance, in the assembled photovoltaic module 240 illustrated in FIG. 2B. Thus, when stacking photovoltaic module frames or assembled photovoltaic modules on top of each other, like for instance illustrated in FIG. 3, the weight or load is transferred mainly through the two opposed support members 104, 105 of the stacking spacers 10 or 100 such that the lower frame 200 in a stacking unit 250 does not have to support all the weight of the above stacked frames 200.

As illustrated in FIGS. 1A and 1B, the connecting member 103 can have a fork-shaped or Y-shaped section 108 with a groove 109 extending along its entire longitudinal dimension. As will be seen in relation to FIG. 2B, the shape of the Y-shaped section 108 can be at least partially form-fitted with the lateral profile groove 206, 207 of the photovoltaic module frame 200. Thus, after inserting, in particular, after sliding, the stacking spacer 10 or 100 in a lateral profile groove 206, 207, movements of the stacking spacer 10, 100 relative to the frame 200 can be restricted. In particular, the geometry of the connecting member 103 can be advantageous when used with substantially C-shaped lateral profile grooves 206, 207 of a photovoltaic module frame 200 because the fork or Y-shaped section can be partially form-fitted with the interior of the substantially C-shaped section of the lateral profile groove 206, 207.

Figure 5:
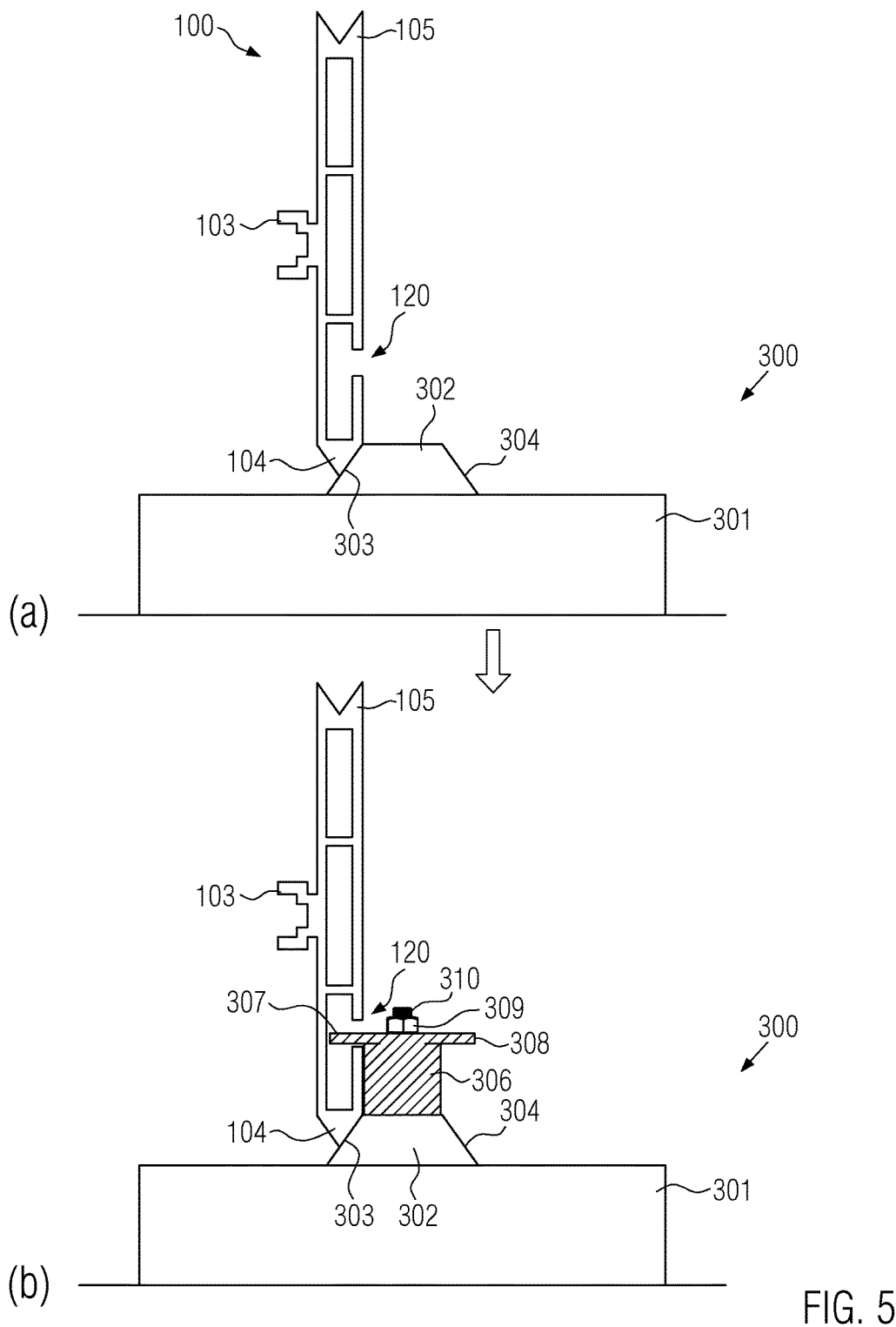
FIG. 5 illustrates an embodiment wherein a stacking spacer is assembled to a tracking device assembly according to the disclosure.

According to the disclosure, the opposed support members 104, 105 have complementary forms. In other words, they are form-fitted. Thus, in both of the embodiments illustrated in FIGS. 1A and 1B, one of the two opposed longitudinal support members 104, 105, here the longitudinal support member 104, can define a protrusion of the main body 101, in particular, it can be convex in a direction facing outwards from the longitudinal edge or side 106 of the first main face 102 or main body 101. Correspondingly, the other one among the two opposed longitudinal support members 104, 105, here longitudinal support member 105, can defines a recess of the main body 101, in particular, it can be concave in a direction facing outwards from the longitudinal edge 107 opposed the longitudinal edge 106 or side of the first main face 102. Furthermore, while in the variant illustrated in FIG. 1A, the opposed support members 104, 105 can be curved, in the variant illustrated in FIG. 1B, the opposed support members 104, 105 can be triangular-shaped, such that they can be received on a spacer 302 of a tracking device assembly 300 as illustrated in FIG. 5 hereafter. In other words, in a given variant, both longitudinal opposed support members 104, 105 have complementary geometries, such that a stack of a plurality of stacking spacers 10 or 100 can be made, such as, for example, in the illustration of FIG. 3, wherein the weight is distributed through the stacking spacers 10 or 100 along the two opposed longitudinal support members 104, 105 and the main body 101, rather than via the frame 200. In this way, it is possible to stack a plurality of frames 200 in a horizontal configuration such as in the stacking unit 250 illustrated in FIG. 3, wherein the bottom frame 200 does not support all the weight of the above lying frames 200. In a preferred variant, the profile 118, 119 formed by each opposed longitudinal support member 104, 105 and the first main face 102 can be substantially form-fitted with the lateral profile of a photovoltaic module frame 200, as illustrated in FIG. 2B. Thus, it is possible to improve the fixation and restrict the movements of a stacking spacer 10, 100 relatively to a frame 200. Furthermore, it is possible to shape the stacking spacer 10, 100 so as to protect the edges of a frame 200 and thus prevent efficiently a contact between successive frames 200 in a stack of frames or assembled modules.

Figure 6:
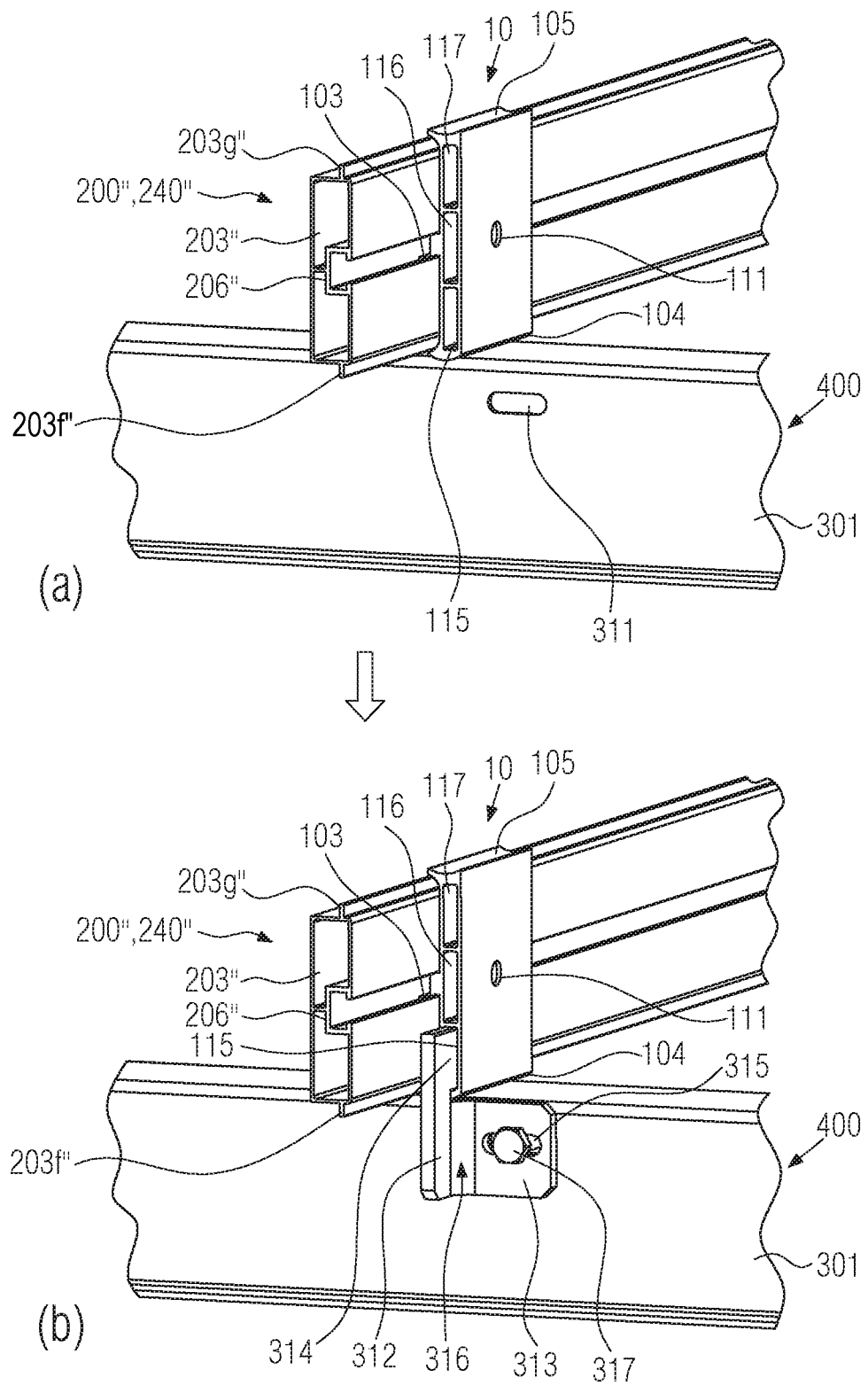
FIG. 6 illustrates an embodiment wherein a stacking spacer is assembled to a tracking device assembly following a variant of the disclosure.

For better stability, the stacking spacer 10 and/or the stacking spacer 100 illustrated in FIGS. 1A and 1B, respectively, in particular, the main body 101 thereof, can also comprise a second main face or back face 112 of similar rectangular geometry than the first main face 102, parallel to the first main face 102. The back face 112 and the first main face 102 are joined at least by the two opposed support members 104, 105, in other words by the opposed sides or edges 106, 107, which act as side walls of the main body 101. Thus, the space between the first main face 102, the back face 112 and the two opposed longitudinal support members 104, 105 can form at least one inner longitudinal cavity or recess 115, 116, 117 of the main body 101. In the example of stacking spacers 10, 100 illustrated in FIGS. 1A and 1B, following a preferred variant, the first main face 102 and the back face 112 can be further joined by two longitudinal inner side walls 113, 114, which are substantially perpendicular to the first main face 102 and to the back face 112, and extend over the entire longitudinal dimension of the main body 101. Thus, in the embodiments illustrated in FIGS. 1A and 1B, this forms, in particular, three longitudinal inner cavities or recesses 115, 116, 117 of the main body 101. This geometry provides for better stability and reinforcement of the structure of the stacking spacers 10, 100. Furthermore, at least one of the inner cavities 115, 116, 117 can be adapted, in particular, shaped or sized, such that it can receive, in particular, slidably, at least partially a mounting bracket 316 of a tracking device assembly 400 as illustrated in FIG. 6 hereafter.

Advantageously, the stacking spacer 100 of the variant illustrated in FIG. 1B can also be provided with a recess 120, arranged preferably on the back face 112, and adapted, in particular, shaped or sized, such that it can receive, in particular, slidably, at least partially a mounting bracket 306 of a tracking device assembly 300 as illustrated in FIG. 5 hereafter.

Furthermore, it is possible to fix any one of the variants of a stacking spacer 10, 100 to a photovoltaic module frame 200, in particular, to a photovoltaic module frame 200 according to the disclosure, in particular, by means of a fixing means, here the screw 110, which is lead through a threaded hole or through bore 111 that can be provided on the main body 101. Fixing the stacking spacer 10, 100 to or against the photovoltaic module frame 200 will prevent a longitudinal movement of the stacking spacer 10, 100 along the lateral profile groove 206, 207 of the photovoltaic module frame 200. This is useful for better support during transport of the frames 200 or for stability when mounting the modules on tracking units. The threaded hole 111 can preferably extend from the back face 112 to the protruding connecting member 103 on the first main face 102, such that the head of the screw 110 can be on the side of the back face 112. Thus, when a stacking spacer 10 or 100 is accommodated in a lateral profile groove 206, 207 of a frame 200, as illustrated in FIG. 2B, the screw 110 protruding from the threaded hole 111 can apply pressure on the lateral profile groove 206, 207 of the side wall 203 of the frame 200. Thus, it is possible to prevent a longitudinal movement of the inserted stacking spacer 10, 100 according to this embodiment along the lateral profile groove 206, 207 of a photovoltaic module frame 200.

Figure 2A:
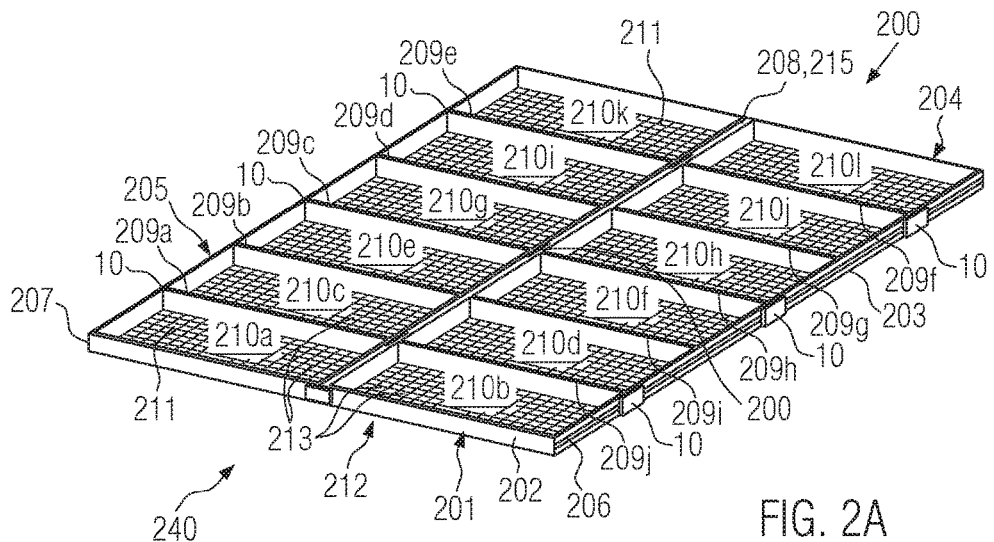
FIGS. 2A-2C illustrate an embodiment of an assembled photovoltaic module using a frame according to the disclosure, in a perspective view (FIG. 2A), in a cross-section view (FIG. 2B), and in a detailed cross-section view (FIG. 2C)
Figure 2B:
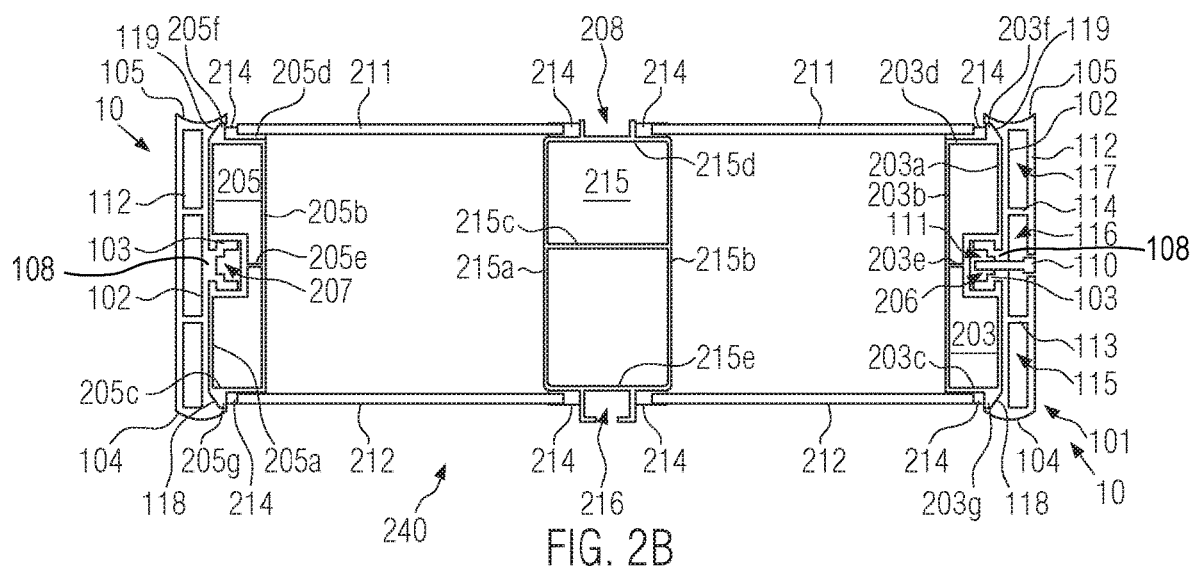
Figure 2C:
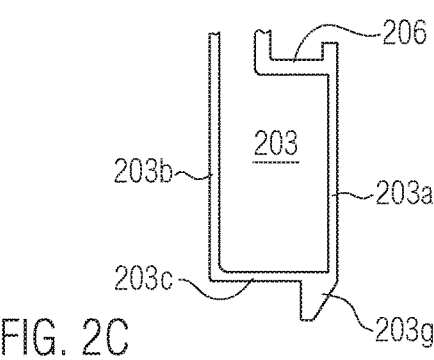

Although the inventive stacking spacers 10, 100 of the embodiments illustrated in FIGS. 1A and 1B have been described mostly in conjunction with the inventive photovoltaic module frame 200 of the embodiment illustrated in FIGS. 2A-2C, it will be clear to a person skilled in the art that the variants of the inventive stacking spacers 10, 100 can in fact be used with photovoltaic module frames known in the art having lateral profile grooves. For instance, the profile of Y-shaped section 108 of the connecting member 103 and the distance between the opposed support members 104, 105 can be adapted to the lateral profile of photovoltaic module frames known in the art.

In the illustrative embodiments represented in FIGS. 1A and 1B, the stacking spacer 10, 100 can be made of aluminum or steel. However, other materials can be chosen in other embodiments, for instance, any other metal or metallic alloy or composite material, provided that they give enough rigidity and stability for use in stacks of photovoltaic module frames. Indeed, stacking spacers 10, 100 made out of a metallic material, such as aluminum have the advantage to be much more resistant than known solutions of the state of the art using plastic materials. Thus, it is possible to reuse the inventive stacking spacers 10, 100, as they can be mounted and dismounted on frames 200 substantially without undergoing any damage.

FIGS. 2A-2C illustrate an embodiment of an inventive photovoltaic module frame 200 used in an assembled photovoltaic module 240. FIG. 2A shows a tridimensional view of the frame 200 and assembled photovoltaic module 240, while FIG. 2B shows a cross-section view of the assembled photovoltaic module 240, including the frame 200 combined with sets of stacking spacers 10 of the embodiment illustrated in FIG. 1A inserted therein. In turn, FIG. 2C illustrates a detail of the end portion of a lateral profile of the inventive frame 200. Here, it should be noted that sets of stacking spacers 100 of the embodiment illustrated in FIG. 1B could be used as an alternative to the stacking spacers 10 of the embodiment illustrated in FIG. 1A with similar effects and advantages as those described hereafter.

In the example illustrated in FIGS. 2A-2C, a photovoltaic module frame 200 comprises a frame main body 201 of substantially rectangular shape comprising four frame side walls 202, 203, 204, 205, which are opposed two by two. The frame 200 illustrated in FIGS. 2A-2C is rectangular-shaped, but the disclosure can be used on other kinds of frames. The two longitudinal frame side walls 203, 205 extend in the longitudinal direction of the frame 200 and comprise lateral profile grooves 206, 207 extending substantially along the entire longitudinal dimension of the frame 200 from one of the shorter side walls 202 to the other shorter side wall 204, such that at least one stacking spacer 10, or alternatively at least one stacking spacer 100, according to one of the previous embodiments can be inserted, in particular, slidably, in the lateral profile grooves 206, 207. In particular, the lateral profile grooves 206, 207 have a substantially C-shaped section, as illustrated in the section view of FIG. 2B, for form-fitted insertion of the protruding longitudinal connecting member 103 of the stacking spacer 10.

As illustrated in FIG. 2A, the photovoltaic module frame 200 can optionally further comprise a longitudinal central wall 215 joining the shorter side walls 202, 204 to one another, with at least one central profile groove 208. FIG. 2B illustrates that the frame 200 comprises, in fact, two central profile grooves 208, 216, which can be divided into a central profile groove 208 with a substantially U-shaped section and a central profile groove 216 with a substantially C-shaped section. The frame 200 can optionally further comprise a plurality of inner walls 209a, . . . , 209j parallel to the frame side walls 202, 204, substantially perpendicular to the longitudinal central wall 215 and the longitudinal side walls 203, 205, and joining the longitudinal side walls 203, 205 to the longitudinal central wall 215. A plurality of spaces can thus be defined, in which individual photovoltaic modules can be mounted. In the embodiment illustrated in FIG. 2A, twelve individual photovoltaic modules 210a, . . . , 210l each comprising a lens plate 211 and a receiver plate 212 having at least one photovoltaic cell 213 thereon, in particular, a concentrator photovoltaic cell, more in particular, a plurality of photovoltaic cells, can be mounted in the frame 200, forming thus an assembled photovoltaic module 240. The lens plates 211 and receiver plates 212 can be fixed to the frame 200 by a binding material 214, as illustrated in FIG. 2B. It will be clear to the skilled person that, in other embodiments, the frame 200 could comprise more or less sub-divisions than in the present embodiment. In particular, it could comprise more than one longitudinal central wall 215 or none, and/or it could comprise more or less inner walls 209a, . . . , 209j.

According to the disclosure, at least one stacking spacer 10 or 100, in this case a stacking spacer 10 according to the embodiment illustrated in FIG. 1A, can be inserted in each lateral profile groove 206, 207 of the photovoltaic module frame 200. In the example illustrated in FIG. 2A, the photovoltaic module frame 200 comprises sets of three stacking spacers 10 inserted, in particular, slidably, in each one of its lateral profile grooves 206, 207. As mentioned above, in alternative embodiments, the photovoltaic module frame 200 could comprise sets of stacking spacers 100 inserted, in particular, slidably, in each of the lateral profile grooves 206, 207.

In the embodiment illustrated in FIG. 2A, stacking spacers 10 are inserted in the lateral profile grooves 206, 207, preferably until they reach the positions corresponding to the frame inner walls 209j, 209h, 209f and 209a, 209c, 209e, respectively. Other configurations are possible and can depend on the size and weight of the photovoltaic module frames 200 to be used for the assembled photovoltaic modules 240, or on the amount of frames 200 or assembled photovoltaic modules 240 to be stacked on top of each other. Thus, more or less stacking spacers 10, or 100 in alternative embodiments, can be used depending on the stacking and/or transport and/or mounting requirements of a manufacturer or a user.

The cross-section view of FIG. 2B further illustrates the lateral profile or profile of the opposed longitudinal side walls 203, 205 of the frame 200, comprising the lateral profile grooves 206, 207. In this embodiment, the longitudinal frame side wall 203 can comprise an outer side wall 203a, facing outwards relative to the frame 200, and an inner side wall 203b, facing inwards, joined by a lower wall 203c and an upper wall 203d. Furthermore, the side wall 203 can also comprise at least one central horizontal wall 203e joining the lateral profile groove 206 to the inner side wall 203b, as well as two protrusions 203f, 203g extending respectively from the upper wall 203d and from the lower wall 203c. Similarly, the opposed longitudinal frame side wall 205 comprises an outer side wall 205a, an inner side wall 205b, lower and upper walls 205c, 205d, at least one central horizontal wall 205e joining the lateral profile groove 207 to the inner side wall 205b, as well as two protrusions 205f, 205g extending respectively from the upper wall 205d and from the lower wall 205c. Thus, the cross-section views of the longitudinal side walls 203, 205, as illustrated in FIG. 2B, are substantially rectangular-shaped with substantially C-shaped lateral profile grooves 206, 207 that can accommodate the connecting member 103 of an inventive stacking spacer 10, or alternatively 100, inserted therein, in particular, slidably, when stacking and/or transporting is required.

Figure 4:
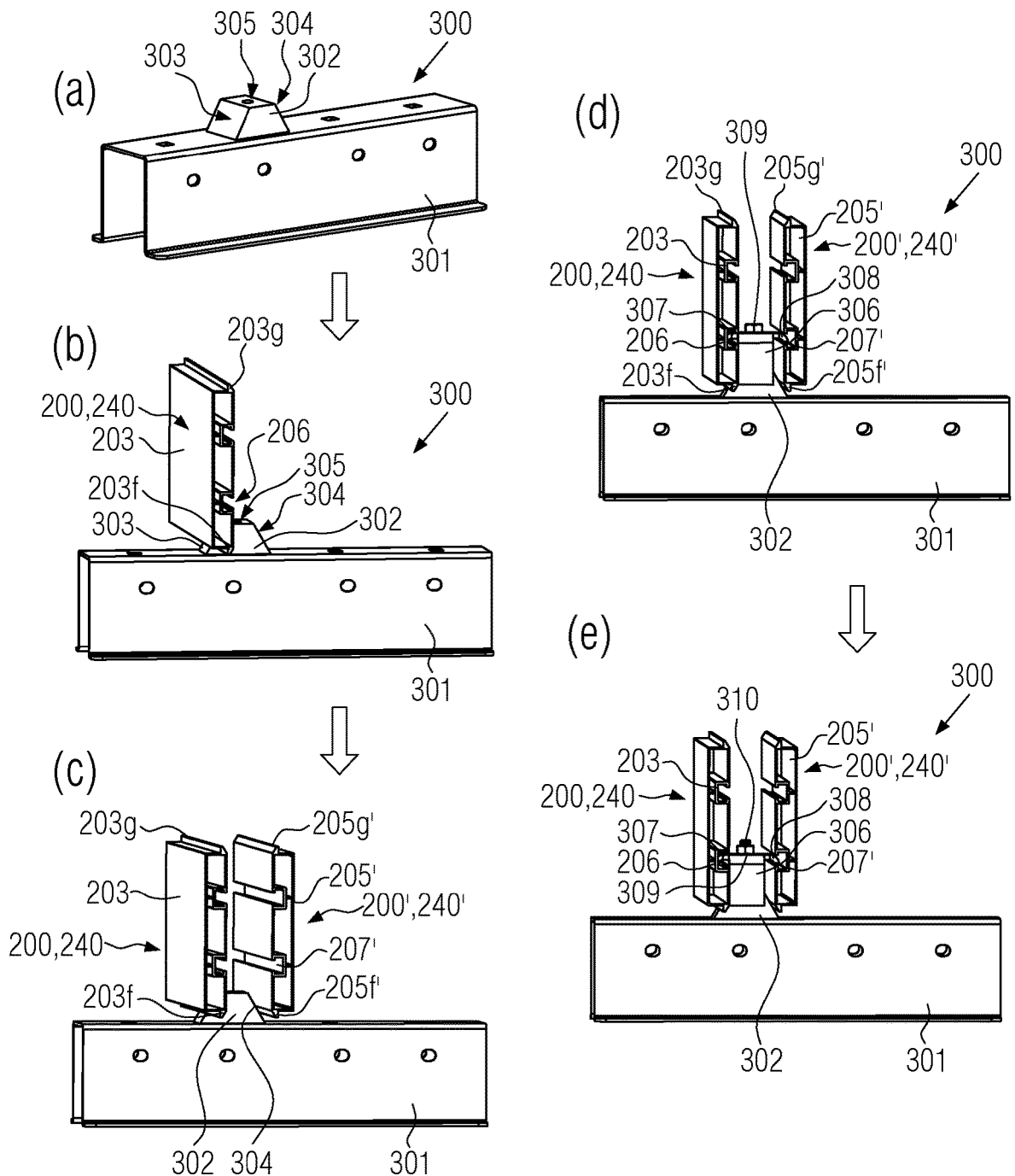
FIG. 4 illustrates an embodiment wherein a photovoltaic module frame is assembled to a tracking device assembly according to the disclosure.

As further illustrated in FIG. 2B and further detailed in FIG. 2C, at least one of the two protrusions 203f, 203g of side wall 203 is adapted, in particular, shaped, such that the side wall 203 can be placed on a spacer 302 of a tracking device assembly 300 as illustrated in FIG. 4 hereafter, in the case that no stacking spacer 10 or 100 is used for the assembly to the tracking unit. Similarly, at least one of the two protrusions 205f, 205g of the opposed side wall 205 can also be adapted, in particular, shaped, to this effect. In the embodiment illustrated in FIGS. 2B and 2C, at least the protrusions 203f and 205f are shaped such that, when the frame 200 is placed on the spacers 302 of the tracking device assembly 300, as illustrated, in particular, in FIG. 4, the frame 200, hence the assembled photovoltaic module 240, is substantially parallel to the rail (stringer 301) of the tracking device assembly 300, as illustrated in FIG. 4. In this embodiment, all protrusions 203f, 203g and 205f, 205g of both side walls 203, 205 are shaped similarly, in particular, symmetrically, such that the frame 200 can be used either in the orientation of FIG. 2B or upside-down, without distinction, for assembling the photovoltaic module 240. Furthermore, as illustrated in FIG. 2B and, in particular, in the detailed view of FIG. 2C, the at least one adapted, in particular, shaped, protrusion can be triangular-shaped, like protrusions 203f, 203g and 205f, 205g, such that it can be accommodated on an angled spacing element of a tracking device assembly, for instance, a trapezoidal prism-shaped spacer 302 like in the embodiment illustrated in FIG. 4.

Further illustrated in the section view of FIG. 2B is the section of the optional longitudinal central wall 215. In this example, the longitudinal central wall 215 can be substantially rectangular-shaped and comprise two side walls 215a, 215b joined by an upper and a lower wall 215d, 215e and further joined by a central wall 215c, which are all substantially perpendicular to the two side walls 215a, 215b. The longitudinal central wall 215 can optionally also further comprise a substantially U-shaped longitudinal central profile groove 208 protruding outwards of the upper wall 215d and/or a substantially C-shaped longitudinal central profile groove 216 protruding outwards of the lower wall 215e. The two protruding side walls of the longitudinal central profile groove 208 forming its substantially U-shaped profile can have substantially the same height as the thickness of the lens plate 211, such that the latter can be flush mounted on the frame 200. This avoids accumulation of water and/or dust on this edge once the assembled photovoltaic module 240 is mounted on a tracking device. It is also advantageous for the mounting of the lens plate 211, as it provides additional side protection to the binding material 214. Furthermore, the sum of the heights of the protruding side walls forming the longitudinal central profile groove 208 and the longitudinal central profile groove 216 can be adjusted to be substantially equal to the distance of the frames 200 as obtained through the stacking spacers 10 or 100.

FIG. 2B also illustrates that the lens plates 211 and the receiver plates 212 can be fixed between the side walls 203, 205 and the longitudinal central wall 215 by means of a binding material 214. Once the lens plates 211 and receiver plates 212 with corresponding lens(es) and photovoltaic cell(s) are mounted and fixed to the frame 200, this can form an assembled photovoltaic module 240.

FIG. 2B further illustrates cross-sections of inserted, in particular, slidably inserted, stacking spacers 10 in each one of the lateral profile grooves 206, 207. In this embodiment, the stacking spacers 10 are similar to those described above in relation to FIG. 1A and comprise thus all the elements illustrated in FIG. 1A, but in alternative embodiments they could be replaced by stacking spacers 100 according to the embodiment described in relation to FIG. 1B. It is thus referred back to the description above for further details. In this example, two stacking spacers 10 or, alternatively, two stacking spacers 100, can be seen in cross-section, each comprising a longitudinal connecting member 103 that is at least partially form-fitted to the substantially C-shaped respective lateral profile grooves 206, 207 of the respective side walls 203, 205. The substantially C-shaped lateral profile grooves 206, 207, or more in general their side walls forming a form-fitted profile for the connecting member 103 of each stacking spacer 10, can have a maintaining role for the stacking spacers 10, in particular, it can improve their stability with respect to the lateral profile grooves 206, 207. For practical reasons related to stacking and/or transport and/or mounting of the frames 200 or assembled photovoltaic modules 240, the stacking spacers 10 on each side of the frame 200 can preferably all be oriented in the same direction relative to the photovoltaic module frame 200. In FIG. 2B, this means that respective recessing support members 105 have the same orientation relative to the opposed side walls 203, 205 on either side of the frame 200, and respective protruding support members 104 have the same orientation relative to the opposed side walls 203, 205 on either side of the frame 200. Finally, the stacking spacer 10 inserted in the left lateral profile groove 207 is shown without a fixing means (screw 110) or a threaded hole 111, whereas the stacking spacer 10 inserted in the right lateral profile groove 206 is shown with an optional threaded hole 111 and an optional fixing means therein, in this embodiment, a screw 110. As explained above, screwing the screw 110 against the lateral profile groove 206 can prevent a movement of the stacking spacer 10 along the lateral profile groove 206. Fixing the stacking spacer 10 to the frame 200 via the screw 110 is thus optional, and it can either work by fixing it into the frame 200, or by applying pressure between the stacking spacer 10, in particular, the connecting member 103, and the back or side wall of the substantially C-shaped profile of the lateral profile groove 206, with the advantage of the latter of keeping the assembled photovoltaic module 240 sealed. Depending on the requirements for stacking and/or transport and/or mounting of such frames 200, it is thus possible to use stacking spacers 10 with or without a fixing means (screw 110), or combinations of both, as illustrated for instance in FIG. 2B.

Figure 3:
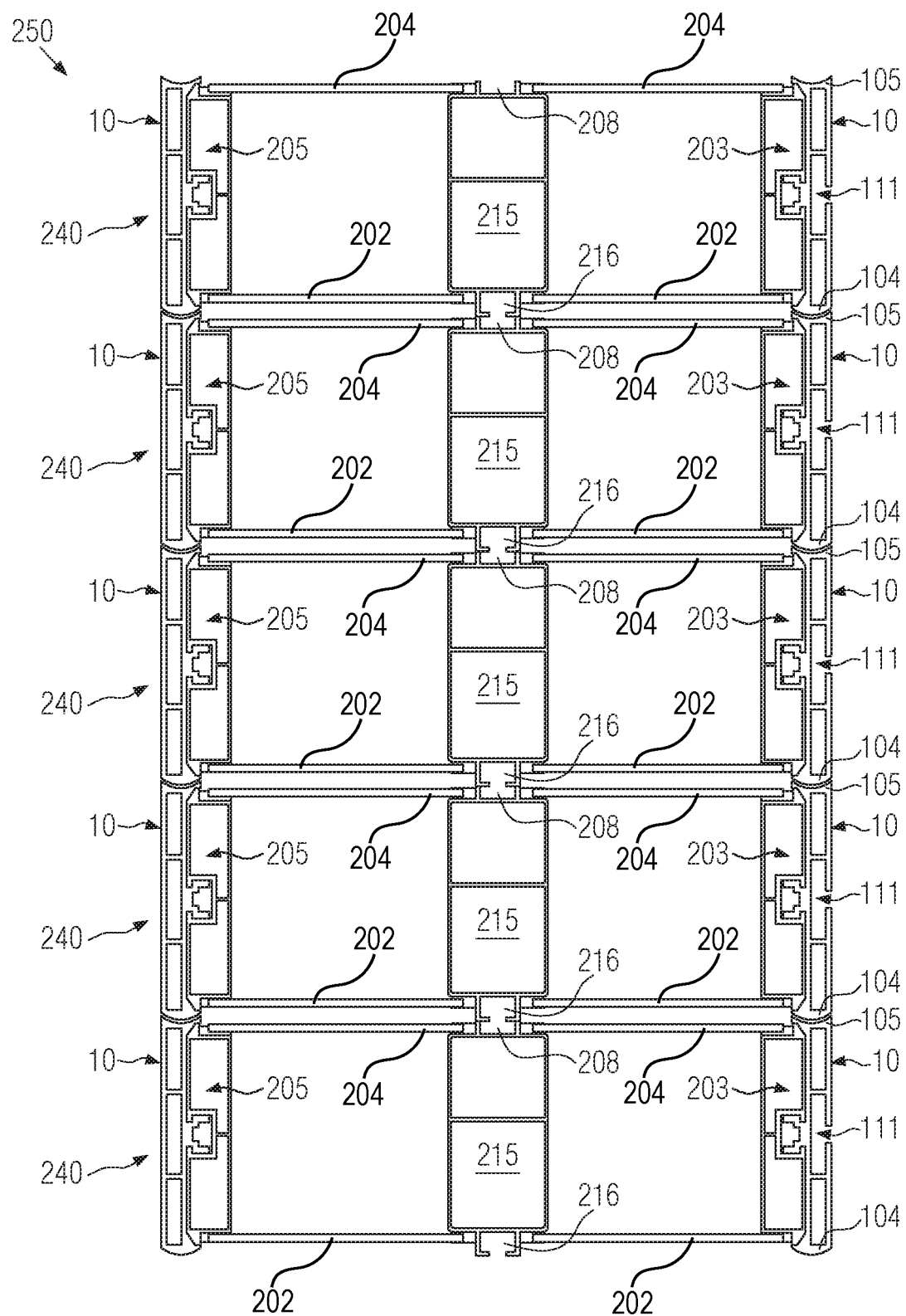
FIG. 3 illustrates an embodiment of a stacking unit comprising a plurality of assembled photovoltaic module frames and stacking spacers according to the disclosure.

FIG. 3 illustrates an embodiment in which a plurality of assembled photovoltaic modules 240 using the inventive frames 200 are stacked using sets of inventive stacking spacers 10, thereby forming a stacking unit 250. In this example, the stacking unit 250 comprises five assembled photovoltaic modules 240, in other words, five photovoltaic module frames 200 stacked horizontally on top of each other. Like in FIG. 2B, at least one stacking spacer 10 is inserted in each corresponding lateral profile groove 206, 207 of a given frame 200. In alternative embodiments, the stacking unit 250 could be achieved using stacking spacers 100 according to the embodiment illustrated in FIG. 1B instead of the stacking spacers 10 of the embodiment illustrated in FIG. 1A.

In the embodiment illustrated in FIG. 3, it can be seen that the concave and convex, or more generally form-fitted, profiles of the opposed support members 104, 105 have the advantage that, when the photovoltaic modules 240 are stacked on top of one another, the opposed support members 104, 105 of their respective stacking spacers 10 provide self-centering means for the stacked photovoltaic modules 240, as a bottom support member 104 of a top stacking spacer 10 will be accommodated into the upper support member 105 of the underlying stacking spacer 10, without requiring to have to position the above-lying photovoltaic module 240 on top of the underlying photovoltaic module 240 in the stacking unit 250 in an exactly centered manner. Therefore, it is possible to roughly arrange the photovoltaic modules 240 on top of one another, and their good positioning can then be obtained via the self-centering of the respective opposed support members 104, 105 of the stacking spacers 10.

In the embodiment illustrated in FIG. 3, the assembled photovoltaic modules 240 of the stacking unit 250 are stacked on top of each other such that the support member 104 of a given stacking spacer 10 is stacked on the form-fitted support member 105 of the underlying stacking spacer 10. It should also be noted, that the dimensions of each stacking spacer 10 according to the disclosure, in particular, the distance between the two opposed support members 104, 105 in each stacking spacer 10, is such that there is no contact between the side walls 202, 203, 204, 205 of successive frames 200 in the stacking unit 250. Thus, the weight or load transfer between the photovoltaic module frames 200 in the stacking unit 250 happens mainly through the stacking spacers 10. Depending on the configuration of the frames 200 used, the weight transfer in a stacking unit 250 can also optionally happen via the central profile grooves 208, 216 protruding from the optional longitudinal central wall 215. In particular, the stacking spacers 10 support most of the weight of each frame 200, and the load or weight of the frames 200 is transferred from top to bottom between successive stacking spacers 10 in the stacking unit 250, rather than directly between the frame side walls 202, 203, 204, 205 of successive frames 200. Similarly, the load of the central profile grooves 208, 216 can be transferred from top to bottom in the stacking unit 250 between central profile grooves 208, 216. The distance between successive frames 200 in the stacking unit 250 can then be determined mainly by the geometry of the stacking spacers 10.

Stacking units 250 such as the one illustrated in FIG. 3 can then, for example, be stored or transported. During the storage or transport, the stacking spacers 10 according to the disclosure will prevent damages on the side walls 202, 203, 204, 205 of the frames 200, and thereby also prevent damages to the respective lens plates 211 and receiver plates 212 by preventing possible damaging contacts between them. Furthermore, the stacking spacers 10 according to the disclosure will also allow a weight or load transfer in the stacking unit 250 mostly through the stacking spacers 10, and optionally also via the central profile grooves 208, 216, instead of directly only from frame 200 to frame 200, thus preventing damages to the stacked frames 200.

As mentioned above, in the embodiments illustrated with reference to FIGS. 2A-2C and FIG. 3, the stacking spacers 100 can provide alternatives to the stacking spacers 10. Thus, the assembled photovoltaic module 240 of the embodiment illustrated in FIGS. 2A-2C, and, therefore, also the stacking unit 250 of the embodiment illustrated in FIG. 3, could be combined, respectively achieved, with sets of stacking spacers 100 according to the embodiment illustrated in FIG. 1B instead of the stacking spacer 10 according to the embodiment illustrated in FIG. 1A.

FIG. 4 illustrates two photovoltaic modules 240 comprising each an inventive frame 200 being assembled to a tracking device assembly 300 according to the disclosure. For the sake of simplicity, each photovoltaic module 240 is only represented by a frame 200 and, in particular, only by the respective lateral profile of side wall 203 or 205 thereof. It is referred back to the description above regarding further details of an assembled photovoltaic module 240, a photovoltaic module frame 200, and the lateral profiles or side walls 203, 205. Also for the sake of simplicity, only the rail or stringer 301 of the tracking device assembly 300 onto which the frames 200 will be mounted is represented. Furthermore, in the embodiment illustrated in FIG. 4, any stacking spacers 10 or 100 according to any of the embodiments illustrated in FIGS. 1A and 1B used for transporting the photovoltaic modules 240 have been removed from the respective lateral profile grooves 206, 207 of the frames 200.

As illustrated in step (a) of FIG. 4, spacers 302 can be provided, in particular, attached, onto the stringers 301 to predefine the positions where the photovoltaic modules 240 will be mounted. For each photovoltaic module 240, at least two spacers 302 are required on either side of the position where the photovoltaic module 240 will be mounted, corresponding to where the protrusions 203f, 205f of a frame 200 will be received. For the sake of simplicity, only one spacer 302 is represented. Optionally, a spacer 302 can have extra contours, which could grab into the stringer 301 to avoid lateral movements of the spacer 302 relative to the surface of the stringer 301. In a preferred variant, as illustrated in FIG. 4, the spacers 302 can be a trapezoid prism with its two angled surfaces 303, 304 being configured for receiving the triangle-shaped protrusions 203f, 205f of an inventive frame 200, as will become evident hereafter. Each spacer 302 can also be provided with a through hole 305, which could optionally be tapped, to allow a better vertical positioning on the stringer 301.

As illustrated in step (b) of FIG. 4, a first photovoltaic module 240, represented here by the lateral profile of side wall 203 of its frame 200, can be positioned on one side of the spacer 302, such that the triangle-shaped protrusion 203f is received on the first angled surface 303 of the spacer 302. The first photovoltaic module 240 cannot slide further down along angled surface of side wall 203 because, as mentioned above, on the opposite side of the photovoltaic module 240, a further spacer 302 is provided (not illustrated), and the protrusion 205f (not illustrated) is received on the second angled surface 304 of that further spacer 302. Thus, the photovoltaic module 240, in particular, the frame 200, can be self-centered due to the positioning of its triangle-shaped protrusions 203f, 205f on the respective angled surface 303 and 304 of the at least two spacers 302 provided on the stringer 301 on either side of the photovoltaic module 240. The positioning is such that the frame 200, hence the photovoltaic module 240, is substantially parallel to the surface of the stringer 301 of the tracking device assembly 300 onto which it is mounted.

As illustrated in step (c) of FIG. 4, a second photovoltaic module 240', which can be in all aspects identical to the first photovoltaic module 240, can be positioned on the other side of the first spacer 302, as already explained above for the first photovoltaic module 240. In further embodiments, more than two photovoltaic modules 240, 240' could be installed on a tracking device assembly 300. Alternatively, only one photovoltaic module 240 could be installed on the tracking device assembly 300, in which case the at least two spacers 302 would then only need to have one angled surface each, meaning either the first angled surface 303 or the second angled surface 304 could be angled. In the embodiment illustrated in FIG. 4, the second photovoltaic module 240' is represented by the lateral profile of side wall 205' of its frame 200', with references numbers being equivalent to those used for the frame 200 of the first photovoltaic module 240 but distinguished by a prime symbol for clarity.

As illustrated in step (d) of FIG. 4, a fixing clamp or mounting bracket 306 can be inserted, in particular, slidably, between the two frames 200, 200' in order to clamp the frames 200, 200' to the stringer 301. The mounting bracket 306 can be substantially T-shaped, such that its bars 307, 308 are received at least partially in the lateral profile groove 206 of the frame 200 of the first photovoltaic module 240, and in the lateral profile groove 207' of the frame 200' of the second photovoltaic module 240'. Thus, mounting brackets 306 can be shaped, in particular, sized, such that they are always in contact with an underlying spacer 302 while having the bars 307 and/or 308 slidably inserted in the lateral profile grooves 206 and/or 207 of a module frame 200.

A welded nut 309 can be positioned and, in particular, welded, above a through hole (not visible) of the mounting bracket 306, aligned with the through hole 305 of the underlying spacer 302, such that the mounting bracket 306 and the spacer 302 can be fixed, for instance with a bolt 310 as illustrated in step (e) of FIG. 4.

Regarding the frames 200, by shaping at least the protrusions 203f, 205f' of the lateral profiles of side walls 203, 205' as described above, it is possible to position an assembled photovoltaic module 240 onto a defined angular piece, for instance the spacer 302, which can be fixed on the tracking device assembly 300. The clamp assembly or mounting bracket 306 could be made of standard, preferably relatively inexpensive, materials.

FIG. 5 illustrates an embodiment wherein sets of stacking spacers 100 according to the embodiment illustrated in FIG. 1B are left inserted in the assembled photovoltaic modules after their transport to the site where the assembled photovoltaic modules are mounted on tracking units. Since the stacking spacers 100 can be adapted to photovoltaic frames known in the art, a variant of this embodiment could be a situation with photovoltaic modules using known frames in order to provide means for stacking the modules without damaging the frames, as well as to provide means for facilitating the assembly of the same on tracking units. Since the inventive stacking spacers 100 are also compatible with the inventive frames 200, a variant of this embodiment could also be a situation where the stacking spacers 100 have been left inserted in the frames 200 after transport. For the sake of simplicity, only one stacking spacer 100 has been represented in FIG. 5. It is referred back to the description above regarding details of the stacking spacers 100. As becomes evident from FIG. 5, a module having stacking spacers 100 inserted in the lateral grooves of the module frame will be mounted on a tracking device assembly 300 as described in relation to FIG. 4. It is, therefore, also referred back to the description above regarding elements of the tracking device assembly 300.

As illustrated in step (a) of FIG. 5, the protruding support member 104 of an inventive stacking spacer 100 can be adapted, in particular, shaped, to be received on the spacer 302 in a similar manner to the protrusions 203f, 205f of an inventive frame 200. Thus, it will be clear to the skilled person that the situation illustrated in step (a) of FIG. 5 is analog to that illustrated in step (b) of FIG. 4. In fact, in the embodiment illustrated in FIG. 5, each inventive stacking spacer 100 inserted in a module frame is analog to the lateral profile of side wall 203 or 205 of a frame 200 in the embodiment illustrated in FIG. 4. In other words, the triangle-shaped support member 104 is received on the first angled surface 303 of the spacer 302. The same effects and advantages as described above in relation to FIG. 4 can also be reached using a known frame, or an inventive frame 200, in combination with the inventive stacking spacers 100. In particular, the same effect of placing the frame essentially parallel to the stringer 301 can be reached using a frame in combination with a set of inventive stacking spacers 100.

In a similar manner to steps (d) and (e) of FIG. 4, step (b) of FIG. 5 illustrates how the mounting bracket 306 can be received partially, via its bars 307 and/or 308 in the recess 120 of a stacking spacer 100, and how it can be fixed to the spacer 302 and the stringer 301 using a nut 309 and bolt 310.

Furthermore, also by analogy to the embodiment illustrated in FIG. 4, it will be clear to the skilled person that another stacking spacer 100, hence another frame, can also be received on the second angled surface 304 of the spacer 302.

As mentioned above, it will also be clear for a person skilled in the art that a tracking device assembly 300 comprising a plurality of spacers 302 and mounting brackets 306 could accommodate (i) one or more assembled photovoltaic modules 240 using inventive frames 200 without stacking spacers, and/or (ii) photovoltaic modules using frames known in the art in combination with inventive stacking spacers 100, and/or (iii) assembled photovoltaic modules 240 using inventive frames 200 in combination with inventive stacking spacers 100, and/or (iv) combinations of the above.

FIG. 6 illustrates an alternative embodiment also using stacking spacers inserted in assembled photovoltaic modules for mounting the same on tracking device assemblies 400. However, in the embodiment illustrated in FIG. 6, instead of the stacking spacers 100 of the previous embodiment, stacking spacers 10 according to the variant illustrated in FIG. 1A are used. Furthermore, the assembled photovoltaic modules 240" of this embodiment use known module frames 200" instead of the inventive photovoltaic module frames 200 described above. Like in previous embodiments, in the embodiment illustrated in FIG. 6, the assembled photovoltaic module 240" is represented by the lateral profile of one of the side walls 203" of its frame 200" only, with references numbers being equivalent to those used for the previous photovoltaic module frames 200 but distinguished by a double prime symbol. In this embodiment, however, the known module frame 200" has end profiles 203f", 203g", which are not adapted to be mounted on a tracking device assembly without using sets of the inventive stacking spacers 10 or 100. However, from the above, it will be clear that inventive module frames 200 could be also used in alternative embodiments instead of the known module frame 200". It would also be possible to use stacking spacers 100 according to the embodiment illustrated in FIG. 1B instead of stacking spacers 10 according to the embodiment illustrated in FIG. 1A.

Thus, as explained above and, in particular, by analogy to the embodiments described with reference to FIGS. 2A-2C, prior to mounting the assembled photovoltaic module 240" to a tracking device assembly 400, sets of stacking spacers 10 are firmly assembled to the module frame 200", in particular, after being inserted in its lateral profile grooves. In FIG. 6, for the sake of simplicity, only one stacking spacer 10 is shown mounted in the longitudinal groove 206" of a side wall 203" of the frame 200".

As illustrated in step (a) of FIG. 6, the assembled photovoltaic module 240" comprising sets of inventive stacking spacers 10 can be directly placed onto the stringer 301 of a tracking device assembly 400. In particular, depending on the orientation of the stacking spacer 10 relative to the module frame 200", one of the two opposed support members 104, 105 can be placed on the stringer 301, here support member 104. This could be analog to step (a) in FIG. 5, however without using spacers 302.

As illustrated in FIG. 6, the tracking device assembly 400 of this embodiment does not use the spacers 302 of the previous embodiment. Thus, as illustrated in step (b) of FIG. 6, and by analogy to step (b) of FIG. 5, a mounting bracket 316 can be slidably inserted or pushed into at least one of the inner longitudinal cavities or recesses 115, 116, 117 of the stacking spacer 10, here inner cavity 115. Thus, in this embodiment, the mounting bracket 316 can comprise a central element 312 from which protrudes, in particular, perpendicularly at one extremity, at least one mounting bar 314 adapted to be inserted at least partially, in particular, slidably inserted, into the recess 115 of the stacking spacer 10. Further, the mounting bracket 316 can also comprise, perpendicularly to the central element 312 and at the other extremity thereof, and, in particular, also perpendicularly to at least one mounting bar 314, a fixing element 313 with an opening 315. The opening 315 can be used for centering the assembly with respect to a corresponding bore or opening 311 in the stringer 301. Both openings 311, 315 can advantageously be elongated such that slight lateral positioning adjustments along the stringer 301 can be made. As further illustrated, the mounting bracket 316 can then be fixed by a bolt 317 to the stringer 301, and the bolt 317 can in turn be fixed to the stringer 301, for instance, with a nut provided on the other side of the stringer 301 (not visible). Since the same system can be used on the opposite side of the photovoltaic module 240" or module frame 200", on the lateral side wall opposite side wall 203", the module 240", in particular, the frame 200", cannot slide laterally and is firmly fixed to the tracking device assembly 400.

Since the inventive stacking spacers 10 or 100 can comprise a plurality of inner recesses 115, 116, 117, in alternative embodiments, the mounting bracket 316 could have more than one mounting bar 314 that could be received therein.

In variants of the embodiment illustrated in FIG. 6, it will be clear for a person skilled in the art that a tracking device assembly 400 comprising mounting brackets 316 could accommodate (i) one or more assembled photovoltaic modules 240 using inventive frames 200 in combination with inventive stacking spacers 10, and/or (ii) one or more assembled photovoltaic modules 240 using inventive frames 200 in combination with inventive stacking spacers 100, and/or (iii) assembled photovoltaic modules 240" using frames 200" known in the art in combination with inventive stacking spacers 10, and/or (iv) assembled photovoltaic modules 240" using frames 200" known in the art in combination with inventive stacking spacers 100, and/or (v) combinations of the above.

Stacking spacers 10, 100 for insertion in the lateral profile grooves of a photovoltaic module frame, and their variants, have the advantage that the load transfer between frames in a stacking unit happens mainly between stacking spacers 10, 100 and not between the frames themselves, whether inventive frames 200 or frames known in the art are used. Photovoltaic frames or assembled photovoltaic modules stacked using stacking spacers 10, 100 are protected from damage to the frames themselves, as well as to the lens plates and receiver plates, as a direct contact between frames can be at least partially and, depending on the type of frame used, even also fully avoided.

A further advantage and possible use of stacking spacers 10, 100 according to the disclosure is that they can be used during the production process of the photovoltaic module frames or assembly of the photovoltaic modules, for example, for horizontal stacking of modules not yet hardened, as a partial replacement or complement of a hardening station, which saves costs at the production facility. Stacking spacers 10, 100 and thus photovoltaic module frames, and assembled photovoltaic modules can be used in stacking units for storage and/or transport purposes before or after completion of the framed photovoltaic modules. Further advantages can also achieved, as described above, when using sets of stacking spacers 10 or 100 with inventive photovoltaic module frames 200.

Furthermore, also according to the disclosure, after transport, the disclosure, in its many aspects can be used for mounting and fixing the assembled photovoltaic modules and/or module frames on a tracking device assembly 300, 400. Stacking spacers 10, 100 according to the disclosure can also be reusable. A solid fixing of at least one, in particular, a plurality, of stacking spacers 10 or 100 to a photovoltaic module frame is also possible, and it is even possible that these elements are built as integral parts of a frame, both possibilities being advantageous for instance for mounting an assembled photovoltaic module on a tracking device assembly 300, 400.

Finally, it is also possible to combine the various aspects of the disclosure and their variants. In particular, an inventive tracking device assembly 300 can accommodate one or more photovoltaic modules 240 using an inventive module frame 200 with or without inventive stacking spacers 100, and/or one or more photovoltaic module frames known in the art used in combination with sets of inventive stacking spacers 100. Similarly, an inventive tracking device assembly 400 can accommodate one or more photovoltaic modules 240 using an inventive module frame 200 in combination with sets of inventive stacking spacers 10 or 100, and/or one or more photovoltaic module frames known in the art used in combination with sets of inventive stacking spacers 10 or 100.

The invention claimed is:

1. A stacking spacer for a photovoltaic module frame having at least two opposed side walls provided with at least one respective longitudinally extending groove, the stacking spacer comprising:
    a main body extending in a longitudinal direction;
    a connecting member extending in the longitudinal direction and protruding from the main body, the connecting member adapted for being inserted in the at least one groove of the photovoltaic module frame; and
    two opposed support members on respective opposed longitudinal sides of the main body, the two opposed support members extending in the longitudinal direction, the two opposed support members having complementary forms, whereby at least two stacking spacers can be securely stacked on top of one another, and wherein a support member of the two opposed support members defines a protrusion with respect to the main body and the other support member of the two opposed support members defines a recess with respect to the main body;
    wherein the main body comprises a first main face forming a substantially form-fitting profile for a side wall of the at least two opposed side walls of the photovoltaic module frame, and wherein the connecting member protrudes from the first main face; and
    wherein the connecting member is at least partially form-fitted with the at least one groove of the photovoltaic module frame and has a Y-shaped section; and
    wherein the main body further comprises:
        a second main face opposed to the first main face;
        at least one through bore extending through the stacking spacer from a longitudinal end of the stacking spacer to another, opposite longitudinal end of the stacking spacer, between the first main face and the second main face of the main body, wherein the at least one through bore is adapted for partially receiving therein a mounting bracket of a tracking device assembly; and
        at least one additional through bore extending through the connecting member and adapted for receiving fixing means therein, whereby the stacking spacer can be securely fixed to the photovoltaic module frame.

2. The stacking spacer of claim 1, wherein one of the two opposed support members is adapted for being received on a spacing element of a tracking device assembly.

3. The stacking spacer of claim 2, wherein the two opposed support members are triangular-shaped, whereby the one of the two opposed support members defines a triangular-shaped protrusion adapted for being received on an angled spacing element of a tracking device assembly.

4. The stacking spacer of claim 1, made of or comprising a metal or a metallic alloy, or a composite material.

5. The stacking spacer of claim 1, wherein the at least one additional through bore extends through the first main face and the second main face of the main body.

6. A photovoltaic module frame, comprising:
    at least two opposed side walls;
    wherein each side wall of the at least two opposed side walls is provided with at least one groove extending in a longitudinal direction of the side wall and facing outwards from the photovoltaic module frame; and
    wherein each side wall of the two opposed side walls is further provided with at least one protrusion, extending in the longitudinal direction of the side wall and such that, in a cross-section of the side wall taken perpendicularly to the longitudinal direction, the at least one protrusion protrudes from an end of the side wall perpendicularly to the longitudinal direction; and
    at least one spacing element, comprising:
        a main body extending in a longitudinal direction;
        a connecting member extending in the longitudinal direction and protruding from the main body, the connecting member inserted in the at least one groove of the photovoltaic module frame; and
        two opposed support members on respective opposed longitudinal sides of the main body, the two opposed support members extending in the longitudinal direction, the two opposed support members having complementary forms, whereby at least two stacking spacers can be securely stacked on top of one another, and wherein a support member of the two opposed support members defines a protrusion with respect to the main body and the other support member of the two opposed support members defines a recess with respect to the main body;

wherein the main body comprises a first main face forming a substantially form-fitting profile for a side wall of the at least two opposed side walls of the photovoltaic module frame, and wherein the connecting member protrudes from the first main face; and wherein the connecting member is at least partially form-fitted with the at least one groove of the photovoltaic module frame and has a Y-shaped section; and wherein the main body further comprises:

a second main face opposed to the first main face;

at least one through bore extending through the at least one spacing element from a longitudinal end of the at least one spacing element to another, opposite longitudinal end of the at least one spacing element, between the first main face and the second main face of the main body, wherein the at least one through bore is adapted for partially receiving therein a mounting bracket of a tracking device assembly; and at least one additional through bore extending through the connecting member and adapted for receiving fixing means therein, whereby the at least two stacking spacers can be securely fixed to the photovoltaic module frame.

7. The photovoltaic module frame of claim 6, wherein the at least one protrusion is substantially triangular-shaped.

* * * * *